Patented Sept. 27, 1938

2,131,350

UNITED STATES PATENT OFFICE 2,131,350

TREATMENT OF SUBSTANCES CONTAINING TANTALUM AND/OR NIOBIUM

Joseph Pierre Leemans, Hoboken-lez-Anvers, Belgium, assignor to Société Générale Métallurgique de Hoboken, Hoboken-lez-Anvers, Belgium, a Belgian limited company No Drawing. Application April 26, 1937, Serial No. 139,018. In Great Britain April 28, 1936

2 Claims. (Cl. 75—131)

This invention relates to a process of treatment of substances (ores of tantalum or niobium, metallurgical by-products or the like) containing tantalum and/or niobium (which may be in oxidized form) and in the presence of at least one of the following metals: tin, manganese, iron.

The invention consists broadly in removing those of the elements tin, manganese, iron which are present in the substance treated, prior to the extraction of tantalum and/or niobium.

The removal of Sn and/or Mn and/or Fe may be effected by a reducing operation in the presence of a solid reducing agent (charcoal for instance), or of a reducing gas such as hydrogen, water gas, carbon monoxide, etc.

The material treated may be previously crushed, or put into pastille form, or it may be subjected to any other convenient physical treatment.

The mixture of raw material and reducing agent may be placed in a receptacle (furnace for instance) capable of being closed with a tight-joint fit and the atmosphere of which may be regulated at will, as to its nature, or as to pressure.

The mixture is brought to the required temperature, which is to be determined by experiment for each particular case, according to the composition of the mixture treated, and should be such that any melting of the charge should be avoided. In certain cases a temperature comprised between 800° C. and 1200° C. has been found advantageous.

After the reducing operation, and if necessary after being crushed, the treated product may be subjected to leaching so as to dissolve the reduced Sn and/or Mn and/or Fe. The solution of Sn and/or Mn and/or Fe may be separated from the residue by any known means. The tantalum and/or niobium are then extracted by any known means from the residue. This extraction is greatly facilitated by the absence of Sn, Mn, Fe. For instance the residue may be reduced in an electric furnace in the presence of aluminum and/or calcium and/or magnesium.

The primary material may be subjected inside a suitable furnace to the action of a gaseous mixture for removing the Sn and/or Mn and/or Fe.

Use may be made as the gaseous mixture of a mixture of hydrogen and chlorine, the respective amounts of the two gases being preferably such that there should be more than one molecule of hydrogen for a molecule of chlorine.

Particularly favourable results can be obtained by using an amount of hydrogen in volume approximately equal to from 5 to 10 times the amount of chlorine in volume.

The raw material may be subjected to a preliminary treatment, for instance to crushing, or it may be put in pastille form or be subjected to any other suitable physical treatment. It is afterwards placed into intimate contact inside any suitable apparatus, with the gaseous mixture and brought to the temperature required for the reaction.

The reaction temperature may be determined by experiment in each particular case and varies according to the composition and to the nature of the material treated. It should be such as to avoid a melting of the charge. In certain cases, temperatures comprised between 750° C. and 1000° C. have been found advantageous.

Any suitable apparatus may be used, such as a fixed furnace, or a tilting or oscillating furnace, electrical or non-electrical, with a continuous or non-continuous operating cycle, in which the material may be subjected to the action of gaseous H and Cl without coming into direct contact with the flame or with the combustion gases. By way of example, the heating may be carried out inside electrical resistance furnaces or inside crucible or retort or muffle furnaces.

The apparatus may be provided with any known means for admitting gases on the one hand and evacuating gaseous reaction products on the other hand. The gases obtained during the various stages of the operation may be collected together or separately by any known suitable means.

The raw material treated for the removal of tin and manganese may be subjected to a reducing operation in the presence of calcium and aluminum as reducing agents at a sufficiently high temperature (above 1200° C.) to obtain the melting of the mass with production of a slag, the slag produced being separated from the remaining mass which may be subjected to a chemical treatment with a view to recovering the Ta and/or Nb, preferably in oxide form.

The product obtained by the said chemical treatment may be further treated for obtaining the tantalum and/or niobium in the form of ferro-alloys, or in metal form.

It should be noted that by the above said reducing operation, the slag obtained is practically free from tantalum and/or niobium; it contains however the major part of the silica and of the lime present in the raw materials treated.

The alloy produced contains together with the tantalum and/or the niobium, part of the silicon, the iron and other elements of the raw material which are more easily reduced and non-volatile at the temperature of the treatment.

Prior to the reducing operation, the raw material may be subjected to a physical treatment with a view to rendering it more appropriate for a reducing treatment, for instance to a crushing operation.

The reducing operation may be effected in a furnace, such as an electric arc furnace, in the presence of reducing agents and fluxes in proportions to be determined by experiments according to the composition and to the nature of the raw material treated.

The ferro-alloy obtained from the reducing operation may be subjected to a chemical treatment which may comprise the following stages:

An attack of the alloy with sulphuric acid, with a view to eliminating the major part of the iron;

An attack of the residue with a mixture of sulphuric acid and hydrofluoric acid with a view to eliminating the silicon and completing the attack.

A final calcination of the residue, with a view to obtaining the tantalum and/or niobium in the form of a concentrate of anhydride or anhydrides, which may be treated subsequently for obtaining either ferro-tantalum and/or ferro-niobium, or tantalum and/or niobium in the metal state.

According to another feature of the present invention, those of the elements tin, manganese, iron, which are present in the material treated, are removed prior to the extraction of tantalum and/or niobium by a reducing operation in the presence of reducing agents such as Ca, Mg, Si taken separately or together.

The said reducing agents may be used in an amount which is so limited as to obtain a selective reduction of the impurities alone, whilst leaving the oxides of Ta and/or Nb unreduced.

The reducing operation may be carried out in any suitable metallurgical apparatus, such as an electric furnace.

I claim:

1. A process of treating materials containing at least one of the elements tantalum and niobium and at least one of the metals tin and manganese, which comprises subjecting the material to a reducing operation by means of at least one of the elements calcium, magnesium and silicon at a temperature comprised between 800° and 1200° C. so as to obtain a mass in which the tin and/or manganese, are reduced to metal state, leaching the said mass with an acid to obtain a solution containing the tin and/or manganese, and a residue, separating the solution from the residue, and subjecting the latter to a reducing operation at a temperature above 1200° C. in the presence of sufficient iron to melt it with production of a slag and of a ferro-alloy of tantalum or niobium, and separating the slag from the ferro-alloy.

2. A process of treating materials containing at least one of the elements tantalum and niobium and at least one of the metals tin and manganese, which comprises subjecting the material to a reducing operation by means of at least one of the elements calcium, magnesium and silicon at a temperature comprised between 800° and 1200° C. so as to obtain a mass in which the tin and/or manganese, are reduced to metal state, leaching the said mass with an acid to obtain a solution containing the tin and/or manganese, and a residue, separating the solution from the residue, and subjecting the latter to a reducing operation at a temperature above 1200° C. in the presence of sufficient iron to melt it with production of a slag and of a ferro-alloy of tantalum or niobium, separating the slag from the ferro-alloy, treating the ferro-alloy with sulphuric acid and hydrofluoric acid, so as to obtain a solution containing the silicon and the major part of the iron, and a residue, separating the solution from the residue, and calcining the latter.

JOSEPH PIERRE LEEMANS.